United States Patent Office 2,938,337
Patented May 31, 1960

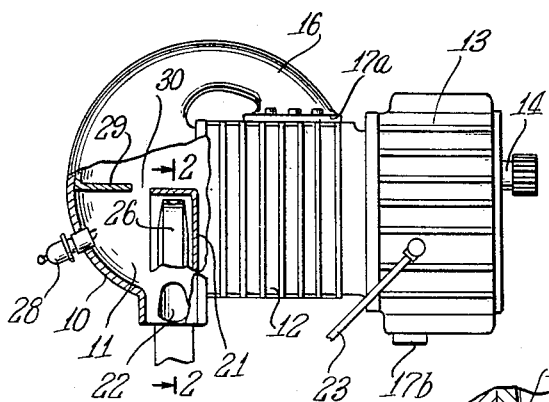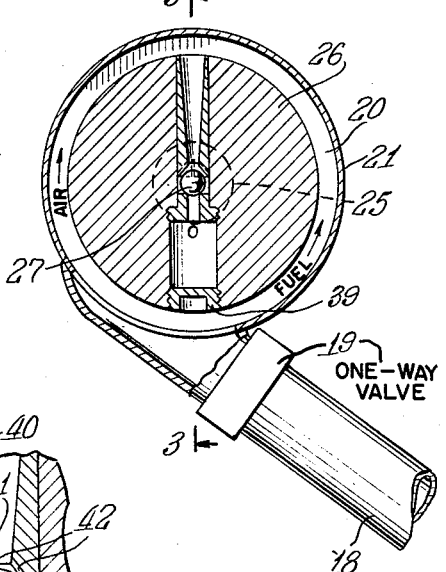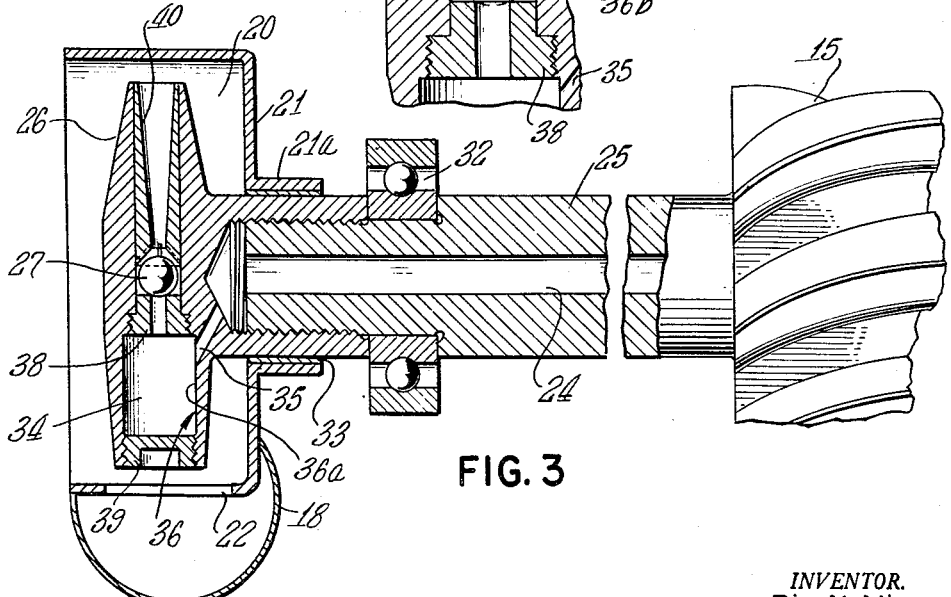

2,938,337
INTERMITTENT COMBUSTION PRODUCTS GENERATOR

Rio N. Mirza, Northport, N.Y., assignor to Fairchild Engine and Airplane Corporation, Hagerstown, Md., a corporation of Maryland Filed Mar. 18, 1957, Ser. No. 646,695
6 Claims. (Cl. 60—39.8)

This invention relates to a novel, highly compact, high speed intermittent combustion motor.

In the motor of the present invention, air and fuel are supplied in the required quantities to a combustion chamber in which they are ignited, and the high pressure gaseous charge resulting from combustion is exhausted through a positive displacement mechanism wherein the expansion of the combustion gases produces torque which is converted into power.

A particular feature of the motor of the present invention is the unique means for feeding, mixing and introducing the necessary quantities of air and fuel into the combustion chamber.

For an understanding of the present invention, reference may be made to the detailed description which follows and to the accompanying drawings in which:

Figure 1 is an elevation view, partly in cross-section, of the motor of the present invention;

Figure 2 is a cross-section view taken substantially along the line 2—2 of Figure 1, looking in the direction of the arrows;

Figure 3 is a cross-section view taken substantially along the line 3—3 of Figure 2, looking in the direction of the arrows; and Figure 4 is an enlarged cross-section view which illustrates the operation of the valve which supplies the fuel intermittently to the combustion chamber.

Referring to Figure 1 of the drawings, the motor of the present invention comprises a housing 10 for a combustion chamber 11, a positive displacement expander 12, a gear transmission system 13, and an output shaft 14. The positive displacement expander may take various forms, but preferably it includes one or more pairs of contra-rotating, helically-lobed rotors 15. Fuel and air are supplied in proportioned quantities to the combustion chamber 11 in which they are ignited at constant volume, and the high pressure gaseous charge resulting from combustion is introduced through an inlet 17a into the positive displacement mechanism 12 via a conduit 16 wherein the combustion gases expand and exert the necessary torque to drive the helical rotors of the positive displacement motor 12. Ultimately, the combustion gases are exhausted from the positive displacement mechanism through an outlet 17b. The torque developed in the positive displacement mechanism 12 is transmitted to the shaft 14 via the gear transmission 13.

In the motor of the present invention, air is supplied to the combustion chamber by a conduit 18 through a one-way check valve 19 to a circular manifold 20. This air is supplied either as an atmospherically induced supply or preferably as a supercharged supply. The manifold 20 is partially enclosed by a circular housing 21 closed at one end and open at the other, the open end thereof being in communication with the combustion chamber 11. The air is admitted into the manifold through an opening 22 in the housing 21, and the air is introduced substantially tangentially so that the air stream moves in a circular path within the manifold in the direction indicated by the arrow in Figure 2.

Fuel is supplied under pressure to the manifold 20 through a conduit 23, an axial passage 24 within a rotatable shaft 25, and a rotatable disc or slinger 26 which is threadably coupled to the end of the shaft 25. As the slinger rotates, fuel is introduced into the manifold 20 intermittently by a ball-type valve 27. The fuel leaves the periphery of the slinger at high pressure under the influence of centrifugal force, and as it rotates, a circular flow is imparted to the fuel within the manifold in the direction indicated by the arrow in Figure 2. Since the flow of air and the flow of fuel within the manifold 20 are in opposite directions, good mixing of air and fuel is obtained.

The open end of the manifold 20 is in direct communication with the combustion chamber 11, and the air-fuel mixture is thereby fed to the combustion chamber in which it is initially ignited by a glow plug 28.

The combustion chamber 11 is defined in part by the interior of the housing 10, in part by a curved wall 29 mounted to the interior wall of the housing 10, and in part by the circular housing 21. The radius of curvature of the wall 29 corresponds to the radius of curvature of the housing 21, so that a substantially uniform gap 30 is defined therebetween, and it is through this gap that the combustion gases are exhausted via the conduit 16 to the inlet 17a of the positive displacement mechanism 12.

The shaft 25 is an extension of the helically-lobed rotor 15. Both the shaft 25 and the extension at the opposite end of the rotor 15 are supported by ball bearings 32. The shaft 25 passes through an axial opening in the hub 21a formed integrally with the housing 21. A suitable seal 33 is provided between the hub 21a and the outer periphery of the shaft 25.

The passage 24 extends entirely through the rotor 15. The fuel line 23 communicates with one end of the passage 24, and the other end of the passage leads into a chamber 34 of the slinger through a passage 35.

The chamber 34 is formed at one end of a cylindrical bore 36 which extends through the slinger 26, passing through and perpendicular to the axis thereof. One end 36a of the bore is of greater diameter than the other end 36b. The inner end of the bore portion 36a is threaded to receive a valve seat 38, and the outer end thereof is threaded to receive a plug or cap 39. The chamber 34 is defined within the bore end 36a between the valve seat and the plug. When the ball valve 27 rests on the valve seat 38 (as shown in Figure 3 and in dotted lines in Figure 4), the center of the ball is located substantially on the axis of the slinger. A tapering passage 40 is accommodated within the bore end 36b, and the inner end of the nozzle forms a seat 41 which, in cooperation with the valve seat 38, retains the ball 27 loosely therebetween. The radial excursion of ball valve 27 between the seats 38 and 41 is extremely small, for example in the order of .010". Grooves 42 are formed in the seat 41 so that a metered quantity of fuel will be permitted to flow through the nozzle when the ball valve 27 is urged against the seat 41.

The fuel is supplied to the chamber 34 under pressure by a fuel pump, and this pressure and the effect of centrifugal force act on the ball valve 27 to urge it against the seat 41. When the ball valve 27 is thus disposed, fuel is fed into the manifold 20 in the desired quantity, mixed with the air as explained above, and the fuel-air mixture is introduced into the combustion chamber 11 in which it is initially ignited by the glow plug 28. During combustion, the pressure within the manifold 20 greatly exceeds the pressure under which the fuel is supplied to the chamber 34, with the result that the ball valve 27 is urged against the seat 38, cutting off the supply of fuel to the manifold. The air supply is also cut off during combustion by the back pressure against the one-way valve 19. After combustion, the pressure decreases within the manifold to a point at which the effect of centrifugal force on the ball valve 27 and pressure of the fuel within the chamber 34 is capable of displacing the valve 27 away from the valve seat 38 and against seat 41. Thus, as this process continues, fuel is fed intermittently into the manifold 20 at a rate proportional to the speed of rotation of the rotors 15, which speed is equally proportional to the rate of air displaced by the rotors, so that a predetermined fuel-air ratio can be maintained.

The combustion process may be sustained within the combustion chamber 11 without the help of the glow plug 28 if the enclosure wall 29 is made of thin sheet metal material. After the first few combustion cycles, the combustion temperatures of 2500° F. and above are capable of maintaining the sheet metal housing at or above auto-ignition temperature, so that the heat of the housing is capable of producing ignition independently of the glow plug.

The positive displacement mechanism 12 may, as mentioned above, take various forms. The helical rotor screw expander of the type known as SRM, named after the Swedish firm of Svenska Rotor Maskiner, AB, has been found to be particularly adapted for use as the positive displacement mechanism due to the fact that it is fundamentally a rotary machine capable of high speeds and displacement rates; also its induction and expansion processes can be accomplished by the use of ports rather than mechanical valves. The SRM machine consists of integrated, counter-rotating male and female helical rotors which intermesh with very close tolerances between respective rotors and between lobes and housing without actual contact therebetween. After each combustion cycle, the high pressure charge is expanded through the positive displacement mechanism through several turns of the meshing rotors. The combustion gases introduced through the inlet port 17a are trapped between the rotor housing and the rotors so that the action of the high pressure combustion charge is translated into torque which drives the rotors. The torque applied to the rotors is, as mentioned above, transmitted to the output shaft 14 through a suitable gear mechanism contained within the housing 13, and the combustion gases are ultimately exhausted through the conduit 17b, from which they may be carried off by a suitable conduit (not shown).

The present invention is also applicable to other positive displacement expanders that do not require valves, including even the common Roots type compressor when utilized as an expander.

The invention has been shown in preferred form and by way of example only, and obviously many variations and modifications may be made therein without departing from the spirit of the invention. The invention, therefore, is not to be limited to any specified form or embodiment, except in so far as such limitations are set forth in the claims.

I claim:

1. An intermittent combustion products generator comprising means defining a combustion chamber, means for conducting air to the combustion chamber, rotatable means in communication with said combustion chamber for introducing the fuel thereto, said rotatable means releasing the fuel therefrom by centrifugal action, a valve carried by said rotating means, a valve seat located inwardly of said valve, whereby centrifugal force urges the valve away from the valve seat toward open position, and a passage for conducting fuel to said combustion chamber through said valve seat, said valve admitting fuel into the combustion chamber until the increase in pressure due to combustion within the chamber automatically closes said valve.

2. An intermittent combustion products generator comprising means for defining a combustion chamber, a rotatable disc, a passage formed within said rotatable disc having an outlet through which fuel is introduced into the combustion chamber, a one-way valve accommodated by said rotatable disc for controlling the flow through said passage to the outlet thereof, a valve seat located inwardly of the valve, and means for conducting fuel under pressure through the valve seat to the inlet side of said valve, said pressure and the centrifugal force of rotation urging said valve to open position, whereby the fuel is introduced into the combustion chamber until the increase in pressure due to combustion within the chamber exerts sufficient closing force on said valve to overcome the combined effects of the centrifugal force and the pressure under which the fuel is fed to the inlet side of the valve, said valve reopening when the pressure within the combustion chamber thereafter decreases.

3. An intermittent combustion products generator comprising means defining a combustion chamber, means for conducting air to the combustion chamber, a rotatable slinger for releasing fuel by centrifugal action, a passage within said slinger through which the fuel is fed to the combustion chamber, a ball valve for controlling the flow of fluid through said passage, a pair of seats for retaining the ball valve loosely therebetween, one located closer to the axis of rotation of the rotatable slinger than the other, and metering fuel passages formed in the outer seat defining a passage for the flow of fuel when the valve is in contact with the outer seat, the ball valve stopping the flow of fuel when urged against the inward seat but permitting the flow of fuel through the passage when urged against the outward seat, the ball valve being normally urged against the outward seat by the pressure under which the fuel is supplied and by the centrifugal force exerted on the ball valve during the rotation of the slinger but being urged against the inward seat by the high pressure produced within the combustion chamber during combustion.

4. An intermittent combustion products generator as set forth in claim 3 including a supporting shaft for said rotatable slinger, said supporting shaft including a passage therein through which the fuel is supplied to the passage within the slinger.

5. An intermittent combustion products generator as set forth in claim 3 in which the passage within the slinger includes a chamber within the slinger upstream of said ball valve for containing a quantity of fuel, and a tapering passage downstream of said ball valve through which the fuel is dispensed.

6. An intermittent combustion motor comprising a combustion chamber, an antechamber in communication with said combustion chamber, means for introducing air into the antechamber, a rotor within said antechamber for introducing fuel by centrifugal action into the antechamber and thereby mixing the fuel and air supplied to the combustion chamber, a fuel passage carried by said rotor for the flow of fuel outwardly therethrough to the antechamber, a valve chamber forming part of said fuel passage, a valve seat at the inner end of said chamber and a valve accommodated within said chamber for limited movement between an outermost open position and an innermost position in contact with said valve seat to close said fuel passage, whereby the valve is moved away from said valve seat by centrifugal force during the operation of said rotor, permitting a flow of fuel through said fuel passage into the antechamber, and the valve is moved in the opposite direction against said valve seat to closed position by the increase in pressure due to combustion within the combustion chamber.

References Cited in the file of this patent

UNITED STATES PATENTS

| | | |
|---|---|---|
| 1,294,834 | Rothweiler | Feb. 18, 1919 |
| 1,913,593 | Hofmann | June 13, 1933 |
| 2,414,828 | McCollum | Jan. 28, 1947 |
| 2,547,560 | Brodzinsky | Apr. 3, 1951 |
| 2,602,291 | Farnell | July 8, 1952 |
| 2,861,425 | Williams | Nov. 25, 1958 |